United States Patent [19]

Weber et al.

[11] Patent Number: 5,756,691
[45] Date of Patent: May 26, 1998

[54] WATER—INSOLUBLE AZO COLORANTS BASED ON N-ACETOACETYLDEHYDROTHIOTOLUIDINE

[75] Inventors: Joachim Weber, Frankfurt; Hans Joachim Metz, Darmstadt, both of Germany

[73] Assignee: Hoechst Aktiengesellschaft, Frankfurt, Germany

[21] Appl. No.: 874,961

[22] Filed: Jun. 13, 1997

[30] Foreign Application Priority Data

Jun. 17, 1996 [DE] Germany ............... 196 24 065.4

[51] Int. Cl.$^6$ .............. C09B 67/20; C09B 29/33; C09D 11/00; D06P 3/79
[52] U.S. Cl. .............. 534/742; 106/31.5; 106/496; 524/83
[58] Field of Search .............. 534/742; 106/31.5, 106/496; 524/83

[56] References Cited

U.S. PATENT DOCUMENTS

| | | | |
|---|---|---|---|
| 1,506,514 | 8/1924 | Zitscher | 534/742 |
| 4,602,961 | 7/1986 | Hari | 534/742 X |
| 4,625,017 | 11/1986 | Puntener | 534/742 X |

FOREIGN PATENT DOCUMENTS

| | | | |
|---|---|---|---|
| 0 138 761 A | 4/1985 | European Pat. Off. . | |
| 393722 | 4/1924 | Germany | 534/742 |

*Primary Examiner*—Fiona T. Powers
*Attorney, Agent, or Firm*—Susan S. Jackson

[57] ABSTRACT

Water-insoluble azo colorant based on N-acetoacetyldehydrothiotoluidine Compound of the formula (I)

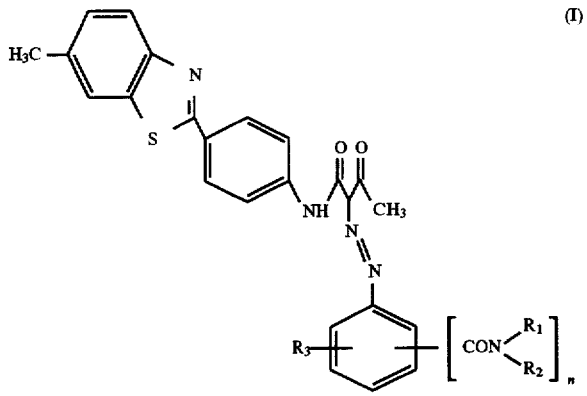

in which $R_1$ and $R_2$ independently of one another are a hydrogen atom, $C_1$–$C_4$-alkyl, $C_5$–$C_6$-cycloalkyl, a benzyl group, an unsubstituted phenyl group or a substituted phenyl group with 1 to 5, preferably 1 to 3, substituents from the group consisting of $C_1$–$C_4$-alkyl, $C_1$–$C_4$-alkoxy, halogen, nitro, cyano, hydroxyl, $CF_3$, $CONH_2$, CONH($C_5$–$C_6$-cycloalkyl), CON($C_1$–$C_4$-alkyl)$_2$, CONH($C_1$–$C_4$-alkyl), COO($C_1$–$C_4$-alkyl), COO($C_5$–$C_6$-cycloalkyl) and CONH(phenyl).

$R_3$ is a hydrogen atom, $C_1$–$C_4$-alkyl, $C_1$–$C_4$-alkoxy, halogen, nitro, cyano, hydroxyl, $CF_3$, COO($C_1$–$C_4$-alkyl) or COO($C_5$–$C_6$-cycloalkyl) and n is 1 or 2.

11 Claims, No Drawings

WATER—INSOLUBLE AZO COLORANTS BASED ON N-ACETOACETYLDEHYDROTHIOTOLUIDINE

DESCRIPTION

Water-insoluble azo colorants based on N-acetoacetyldehydrothiotoluidine

The invention relates to azo pigments based on N-acetoacetyldehydrothiotoluidine and aminobenzoic acid derivatives.

German Reichspatent 393 722 discloses azo pigments based on N-acetoacetyldehydrothiotoluidine and aniline and its methyl-, methoxy-, chlorine-and nitro-substituted homologs, which do not, however, meet the current requirements in respect of heat stability, tinctorial strength and dispersibility in high molecular weight organic materials. They also no longer meet the current requirements in respect of tinctorial strength when used in printing inks.

The present invention was based on the object of providing novel azo pigments with a yellow color shade, high heat stability and high tinctorial strength which meet the current requirements of pigments.

It has been found that azo pigments based on N-acetoacetyldehydrothiotoluidine and aminobenzoic acid derivatives surprisingly achieve the object described.

The present invention relates to a compound of the formula (I)

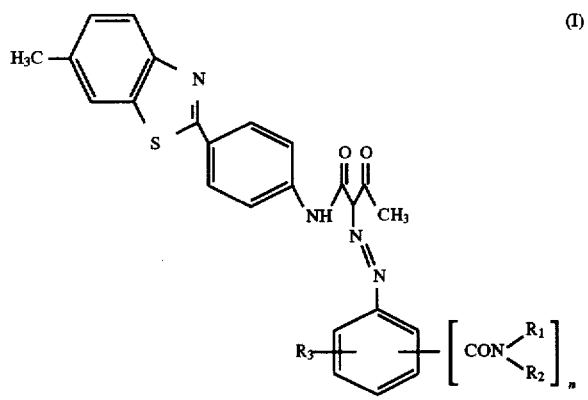

in which

R₁ and R₂ independently of one another are a hydrogen atom, $C_1$–$C_4$-alkyl, $C_5$–$C_6$-cycloalkyl, a benzyl group, an unsubstituted phenyl group or a substituted phenyl group with 1 to 5, preferably 1 to 3, substituents from the group consisting of $C_1$–$C_4$-alkyl, $C_1$–$C_4$-alkoxy, halogen, nitro, cyano, hydroxyl, $CF_3$, $CONH_2$, CONH ($C_5$–$C_6$-cycloalkyl), CON($C_1$–$C_4$-alkyl)₂, CONH ($C_1$–$C_4$-alkyl), COO($C_1$–$C_4$-alkyl), COO($C_5$–$C_6$-cycloalkyl) and CONH(phenyl);

R₃ is a hydrogen atom, $C_1$–$C_4$-alkyl, $C_1$–$C_4$-alkoxy, halogen, nitro, cyano, hydroxyl, $CF_3$, COO($C_1$–$C_4$-alkyl) or COO($C_5$–$C_6$-cycloalkyl) and n is 1 or 2.

Compounds of the formula (I) which are of particular interest are those in which R₁ is a hydrogen atom or a $C_1$–$C_4$-alkyl, preferably methyl, ethyl, isopropyl or n-butyl, a benzyl group or a phenyl group;

R₂ is a hydrogen atom, a $C_1$–$C_4$-alkyl, such as methyl, ethyl, isopropyl or n-butyl, or a phenyl group with 1 to 3 substituents from the group consisting of $C_1$–$C_4$- alkyl, $C_1$–$C_4$-alkoxy, F, Cl, Br, $CF_3$, $CONH_2$, CONH ($C_1$–$C_4$-alkyl) and COO($C_1$–$C_4$-alkyl);

R₃ is a hydrogen atom, methyl, ethyl, methoxy, ethoxy, F, Cl, Br, nitro, $CF_3$, $COOCH_3$ or $COOC_2H_5$; and n is 1 or 2.

Compounds of the formula (I) which are of particular interest are those in which R₁ is hydrogen, methyl, ethyl, isopropyl or n-butyl.

Compounds of the formula (I) which are of particular interest are those in which R₂ is hydrogen, methyl, ethyl, isopropyl, n-butyl, cyclohexyl, benzyl, dimethylphenyl, methoxyphenyl, dimethoxyphenyl, chlorophenyl, dichlorophenyl, dimethoxychlorophenyl, carboxymethylphenyl, carboxamidophenyl, trifluoromethylphenyl or trifluoromethylchlorophenyl.

Compounds of the formula (I) which are of particular interest are those in which R₃ is hydrogen, methyl, ethyl, methoxy, ethoxy, flurorine, chlorine, bromine, nitro, $CF_3$, $COOCH_3$ or $COOC_2H_5$.

The formula (I) is to be understood as an idealized formula and also includes the corresponding tautomeric compounds, as well as the possible configuration isomers of each tautomeric form. The compounds of the formula (I) are usually present in the hydrazone form. The formula (I) therefore also includes, above all, the hydrazone form.

The present invention also relates to a process for the preparation of the compounds of the formula (I) according to the invention, which comprises diazotizing one or more amines of the formula (II)

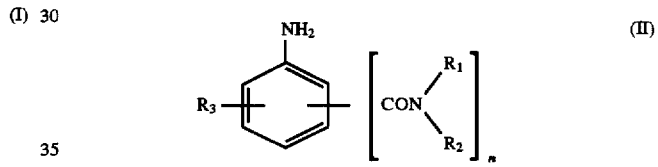

in which R₁, R₂, R₃ and n have the meanings defined in formula (I), and coupling the diazotization product with a compound of the formula (III)

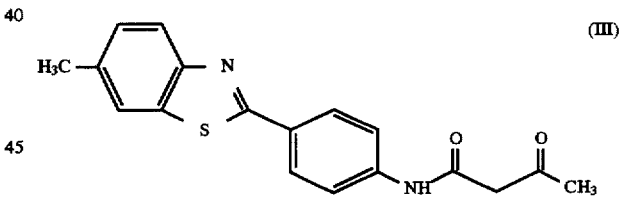

in a molar ratio of 1:0.9 to 1.1, preferably 1:0.95 to 1.05.

The formulae (II) and (III) are to be understood as idealized formulae, which also include the corresponding tautomeric compounds and the possible configuration isomers of each tautomeric form.

Amines of the formula (II) are, for example, 4-aminobenzoic acid amides and 4-aminobenzoic acid amides which contain, in the 2- or 3-position, in particular in the 3-position, a substituent from the group consisting of $C_1$–$C_4$-alkyl, in particular methyl; $C_1$–$C_4$-alkoxy, in particular methoxy; halogen, in particular chlorine; COO($C_1$–$C_4$) alkyl, in particular $COOCH_3$; nitro and $CF_3$. Amines which are furthermore of interest are 3-aminobenzoic acid amide and 3-aminobenzoic acid amides which contain, in the 4- or 5-position, a substituent from the group consisting of $C_1$–$C_4$-alkyl, in particular methyl; $C_1$–$C_4$-alkoxy, in particular methoxy; halogen, in particular chlorine; COO($C_1$–$C_4$) alkyl, in particular $COOCH_3$; nitro and $CF_3$. Both in the case of the 4-aminobenzoic acid amides and in the case of the 3-aminobenzoic acid amides, one or two substituents from the group consisting of $C_1$–$C_4$-alkyl, in particular methyl, ethyl, isopropyl or n-butyl, a benzyl group, a phenyl group or a phenyl group with 1 to 3 substituents from the group consisting of $C_1$–$C_4$-alkyl, in particular methyl, ethyl, isopropyl or n-butyl; $C_1$–$C_4$-alkoxy, in particular methoxy; halogen, in particular chlorine; $CF_3$; $CONH_2$; CONH ($C_1$–$C_4$-alkyl), where alkyl is, in particular, methyl, ethyl, isopropyl or n-butyl; and COO($C_1$–$C_4$-alkyl), where alkyl is, in particular, methyl; can be present on the nitrogen of the amide group, independently of a substitution in the 2- or 3-position (in the case of the 4-aminobenzoic acid amides) or in the 4- or 5-position (in the case of the 3-aminobenzoic acid amides).

The preparation of the amines of the formula (II) is described in the literature, for example in Houben-Weyl, Volume VII, page 647 et seq.

Amines which are preferably used are 4-aminobenzoic acid amide, 4-aminobenzoic acid dimethylamide, 4-aminobenzoic acid n-butylamide, 4-aminobenzoic acid cyclohexylamide, 4-aminobenzoic acid (4'-carboxylic acid amide)-phenylamide, 4-aminobenzoic acid (3',5'-dimethoxy- 4'-chloro)phenylamide, 3-amino-4-methylbenzoic acid amide, 3-amino-4-methylbenzoic acid methylamide, 3-amino-4-methylbenzoic acid (5'-methyl-3'-carboxylic acid n-butylamide)phenylamide, 3-amino-4-methoxybenzoic acid amide, 3-amino-4-methoxybenzoic acid (2'-chloro-5'-trifluoromethyl)phenylamide, 3-amino-4-methoxybenzoic acid (4'-carboxylic acid amide) phenylamide, 3-amino-4-chlorobenzoic acid amide, 3-amino-4-carbomethoxybenzoic acid amide, 3-amino-4-carbomethoxybenzoic acid (2',5'-dichloro)phenylamide and 5-aminoisophthalic acid bisamide.

The coupling component of the formula (III) is N-acetoacetyldehydrothiotoluidine. The preparation of this compound is described in the literature, for example in DRP 409 949.

The compounds of the formula (I) according to the invention are prepared by processes which are known per se by coupling the diazotized amines with the coupling components mentioned in an aqueous medium, if appropriate in the presence of nonionic, anionic or cationic surface-active substances, which can have a turbidity point in an aqueous medium. If appropriate, further auxiliaries, such as naturally occurring or synthetic resins or resin derivatives, or customary additives for paints, printing inks or plastics can also be used if appropriate. The coupling can also be carried out completely or partly in organic solvents.

The coupling reaction is carried out in an aqueous medium by one of the customary methods, by a) adding a solution, suspension or dispersion of the diazonium salt to a suspension or dispersion of the coupling component, or b) metering a solution, suspension or dispersion of the diazonium salt and a solution, suspension or dispersion of the coupling component simultaneously into a buffer solution or into a mixing nozzle, or c) adding a solution of the coupling component to a solution, suspension or dispersion of the diazonium salt, or d) adding a suspension or dispersion of the coupling component to a solution, suspension or dispersion of the diazonium salt.

The process parameters of time, temperature and pH differ only slightly from those in conventional coupling processes and are therefore known to the expert.

Methods a) and d) are particularly advantageous in the process according to the invention.

The compounds of the formula (I) according to the invention are valuable water-insoluble colorants and can be isolated in a customary manner after the coupling reaction. It is often expedient to subject the azo pigments obtained after the coupling reaction to an after-treatment (finish) to achieve the full tinctorial strength and a particularly favorable crystal structure. For example, for this purpose, the moist or dried pigments can be heated in organic solvents, such as, for example, pyridine, N-methyl-2-pyrrolidone, dimethylformamide, dimethyl sulfoxide, alcohols, chlorobenzenes, glacial acetic acid, quinoline, glycols, nitrobenzenes or aromatic hydrocarbons, for some time, if appropriate under increased pressure and if appropriate with the addition of nonionic, anionic or cationic surface-active substances. In some cases, conversion into a favorable crystal structure or achievement of the full tinctorial strength is also possible just by heating with water, if appropriate under pressure and if appropriate with the addition of nonionic, anionic or cationic surface-active substances, which can have a turbidity point in an aqueous medium; or of organic solvents, for example of the above type.

The compounds of the formula (I) according to the invention are particularly suitable for pigmenting high molecular weight organic materials, paints, coating materials, printing inks, electrophotographic toners and developers, powders and powder coatings which can be sprayed triboelectrically or electrokinetically and inks. High molecular weight organic materials are, for example, cellulose ethers and esters, such as ethylcellulose, nitrocellulose, cellulose acetate and cellulose butyrate, naturally occurring resins or synthetic resins, such as addition polymerization resins or condensation resins, for example aminoplasts, in particular urea- and melamine-formaldehyde resins, alkyd resins, acrylic resins and phenoplasts, polycarbonates, polystyrene, polyvinyl compounds, in particular polyvinyl chloride or polyvinyl acetate, polyolefins, in particular polyethylene and polypropylene, polyacrylic compounds, in particular polyacrylonitrile and polyacrylic acid esters, polyamides, polyurethanes or polyesters, rubber, casein, silicone and silicone resins, individually or as mixtures. Cellulose esters, such as nitrocellulose, and polyolefins, such as polyethylene and polypropylene, are particularly preferred as the medium.

It is irrelevant here whether the high molecular weight organic compounds mentioned are present as plastic compositions, as melts or in the form of spinning solutions or are contained in paints, coating materials or printing inks. Depending on the intended use, it proves advantageous to use the pigment formulations obtained according to the invention as extenders or in the form of preparations or dispersions. The pigments according to the invention are employed in an amount of preferably 0.1 to 10% by weight, based on the high molecular weight organic material to be pigmented.

The compounds of the formula (I) according to the invention are distinguished by a particularly high heat stability, good dispersibility in the high molecular weight organic materials and high tinctorial strength. They are furthermore suitable as colorants in electrophotographic toners and developers, such as, for example, one- or two-component powder toners (also called one- or two-component developers), magnetic toners, liquid toners, polymerization toners and special toners (L. B. Schein, "Electrophotography and Development Physics"; Springer Series in Electrophysics 14, Springer Verlag, 2nd edition, 1992).

Typical toner binders are addition polymerization, polyaddition and polycondensation resins, such as styrene, styrene acrylate, styrene-butadiene, acrylate, polyester, phenolic and epoxy resins, polysulfones, polyurethanes, individually or in combination, as well as polyethylene and polypropylene, which can also comprise further constituents, such as charge control agents, waxes or flow auxiliaries, or can subsequently be modified with these additives.

The compounds of the formula (I) according to the invention furthermore are suitable as colorants in powders and powder coatings, in particular in powder coatings which can be sprayed triboelectrically or electrokinetically and which are used for surface coating of objects of, for example, metal, wood, plastic, glass, ceramic, concrete, textile material, paper or rubber (J. F. Hughes, "Electrostatics Powder Coating" Research Studies, John Wiley & Sons, 1984).

Powder coating resins which are typically employed are epoxy resins, polyester resins containing carboxyl and hydroxyl groups, and polyurethane resins and acrylic resins, together with customary hardeners. Combinations of resins are also used. Thus, for example, epoxy resins are often employed in combination with polyester resins containing carboxyl and hydroxyl groups. Typical hardener components (depending on the resin system) are, for example, acid anhydrides, imidazoles and dicyandiamide and derivatives thereof, masked isocyanates, bisacylurethanes, phenolic and melamine resins, triglycidyl isocyanurates, oxazolines and dicarboxylic acids.

The compounds of the formula (I) according to the invention are furthermore suitable as colorants in ink-jet inks on an aqueous and non-aqueous basis and in those inks which operate by the hot-melt process.

To evaluate the properties of the pigments prepared according to the invention in the paint sector, an alkyd-melamine resin varnish (AM) containing aromatics and based on a medium-oil, non-drying alkyd resin was chosen from the large number of known paints.

To evaluate the properties of the pigments prepared according to the invention in the plastics sector, plasticized polyvinyl chloride and polyethylene were chosen from the large number of known plastics.

To evaluate the properties of the pigments prepared according to the invention in the printing sector, an offset printing system based on alkyd resin and an illustration gravure printing system based on nitrocellulose were chosen from the large number of known printing systems.

To evaluate the properties of the pigments prepared according to the invention in the toner sector, a toner system based on polyester resin was chosen from the large number of known toner systems.

To evaluate the properties of the pigments prepared according to the invention in the powder coating sector, a resin system was chosen from the large number of known powder coating systems.

In the following examples, parts are parts by weight and percentages are percentages by weight.

PREPARATION EXAMPLES

Example 1 a) Diazonium salt solution 18.2 parts of 3-amino-4-methoxybenzoic acid amide are stirred in 75 parts by volume of glacial acetic acid and 30 parts by volume of 31% strength hydrochloric acid. After cooling to 5° to 10° C., 13.2 parts by volume of 40% strength sodium nitrite solution are added dropwise in the course of 5 minutes. The mixture is subsequently stirred for 1.5 hours, the solution is clarified by filtration and the excess nitrite is destroyed with amidosulfonic acid.

b) Solution of the coupling component 32.4 parts of N-acetoacetyldehydrothiotoluidine are dissolved in 400 parts by volume of glacial acetic acid at 50° to 60° C.

c) Coupling

The solution of the coupling component and 25.6 parts of a 10% strength aqueous solution of a fatty alcohol polyglycol ether based on a $C_{16}$–$C_{18}$-alcohol, reacted with about 25 parts of ethylene oxide, are initially introduced into a coupling vessel. The pH is brought to 3.6 to 3.7 with 250 parts by volume of 4 normal sodium acetate solution, during which the coupling component precipitates out. The diazonium salt solution is added to this mixture in the course of 50 to 60 minutes. When the coupling has ended, the pigment suspension is heated to 98° C. by passing in steam and this temperature is maintained for 1 hour. The mixture is allowed to cool to 80° C. and the pigment is filtered off and washed with water.

d) After-treatment

The moist press-cake is heated to 130° C. in 1100 parts by volume of N-methylpyrrolidone, while stirring. After cooling to 100° C., the pigment is filtered off with suction, washed with N-methylpyrrolidone and then with acetone and dried at 65° C. After grinding, 46 parts of a greenish-tinged yellow pigment are obtained.

IR spectrum: 3410 $cm^{-1}$, 3174 $cm^{-1}$, 2919$^{-1}$, 2859 $cm^{-1}$, 2361 $cm^{-1}$, 2335 $cm^{-1}$, 1659 $cm^{-1}$, 1606 $cm^{-1}$, 1583 $cm^{-1}$, 1543 $cm^{-1}$, 1516 $cm^{-1}$, 1499 $cm^{-1}$, 1458 $cm^{-1}$, 1448 $cm^{-1}$, 1297 $cm^{-1}$, 1280 $cm^{-1}$, 1254 $cm^{-1}$, 1183 $cm^{-1}$, 1096 $cm^{-1}$, 1016 $cm^{-1}$, 972 $cm^{-1}$, 951 $cm^{-1}$, 895 $cm^{-1}$, 842 $cm^{-1}$, 819 $cm^{-1}$, 613 $cm^{-1}$.

If the procedure is analogous to the preparation example and other bases corresponding to the following Table 1 are employed as the base instead of 3-amino-4-methoxybenzoic acid amide, valuable pigments are likewise obtained:

TABLE 1

| Ex. No. | Base | Color of the pigment |
|---|---|---|
| 2 | $H_2N$–C$_6$H$_4$–C(=O)–$NH_2$ (4-aminobenzamide) | neutral yellow |
| 3 | $H_2N$–C$_6$H$_4$–C(=O)–NH–CH$_2$CH$_2$–CH$_3$ (N-propyl 4-aminobenzamide) | greenish-tinged yellow |

TABLE 1-continued

| Ex. No. | Base | Color of the pigment |
|---|---|---|
| 4 | 4-H$_2$N-C$_6$H$_4$-C(O)-N(CH$_3$)$_2$ | greenish-tinged yellow |
| 5 | 4-H$_2$N-C$_6$H$_4$-C(O)-NH-cyclohexyl | greenish-tinged yellow |
| 6 | 4-H$_2$N-C$_6$H$_4$-C(O)-NH-CH$_2$-C$_6$H$_5$ | greenish-tinged yellow |
| 7 | 4-H$_2$N-C$_6$H$_4$-C(O)-NH-(2,4-dimethylphenyl) | greenish-tinged yellow |
| 8 | 4-H$_2$N-3-Cl-C$_6$H$_3$-C(O)-NH-(4-methoxyphenyl) | reddish-tinged yellow |
| 9 | 4-H$_2$N-C$_6$H$_4$-C(O)-NH-(4-chloro-2,5-dimethoxyphenyl) | neutral yellow |
| 10 | 4-H$_2$N-C$_6$H$_4$-C(O)-NH-C$_6$H$_4$-C(O)O-CH$_3$ | greenish-tinged yellow |
| 11 | 4-H$_2$N-C$_6$H$_4$-C(O)-NH-C$_6$H$_4$-C(O)NH$_2$ | neutral yellow |
| 12 | 4-H$_2$N-3-NO$_2$-C$_6$H$_3$-C(O)-NH-C$_6$H$_5$ | reddish-tinged yellow |
| 13 | 3-NH$_2$-4-CH$_3$-C$_6$H$_3$-C(O)-NH$_2$ | greenish-tinged yellow |

TABLE 1-continued
| Ex. No. | Base | Color of the pigment |
|---|---|---|
| 14 | 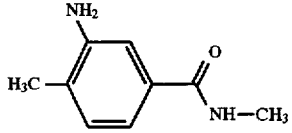 | greenish-tinged yellow |
| 15 | 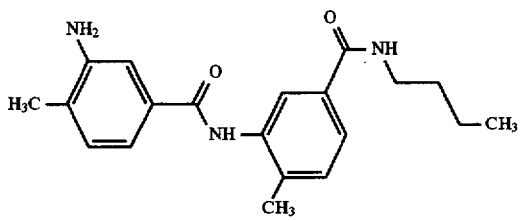 | greenish-tinged yellow |
| 16 | 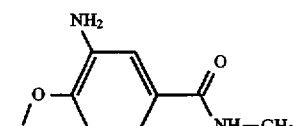 | greenish-tinged yellow |
| 17 | 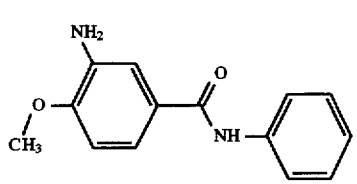 | greenish-tinged yellow |
| 18 | 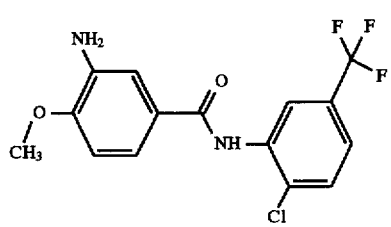 | greenish-tinged yellow |
| 19 | 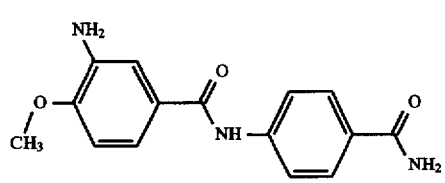 | greenish-tinged yellow |
| 20 | 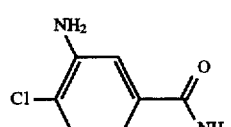 | greenish-tinged yellow |
| 21 | 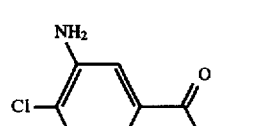 | greenish-tinged yellow |
| 22 | 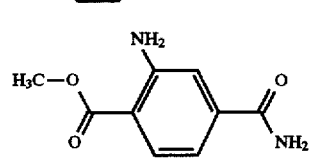 | greenish-tinged yellow |

TABLE 1-continued

| Ex. No. | Base | Color of the pigment |
|---|---|---|
| 23 | (structure: 2-amino-4-methoxycarbonyl-N-methylbenzamide derivative) | greenish-tinged yellow |
| 24 | (structure: 2-amino-4-methoxycarbonyl-N-isopropylbenzamide derivative) | greenish-tinged yellow |
| 25 | (structure: 2-amino-4-methoxycarbonyl-N-(2,5-dichlorophenyl)benzamide derivative) | greenish-tinged yellow |
| 26 | (structure: 5-amino-1,3-benzenedicarboxamide) | greenish-tinged yellow |
| 27 | (structure: methyl 5-amino-3-(N-methylcarbamoyl)benzoate) | greenish-tinged yellow |

Examples of use:

The pigment from Example 1 gives an opaque and deeply colored paint coating of high light-fastness in the AM varnish. In offset printing and illustration gravure printing, glossy, transparent and deeply colored prints are obtained. In plasticized polyvinyl chloride, good dispersibility, good depth of color and a pure color shade are obtained. Testing in polyethylene shows high heat stability and a good depth of color. Testing in the toner system shows compatibility and homogeneous dispersibility in the binder, good depth of color and favorable transparency. The constant electrostatic influence on the toner system during triboelectric charging is particularly advantageous. Testing in the powder coating system demonstrates the sprayability of the coating and deposition thereof on the workpiece.

The pigments from Examples 2 to 27 give deeply colored paint coatings with pure color shades in the AM varnish.

What is claimed is:

1. A compound of the formula (I)

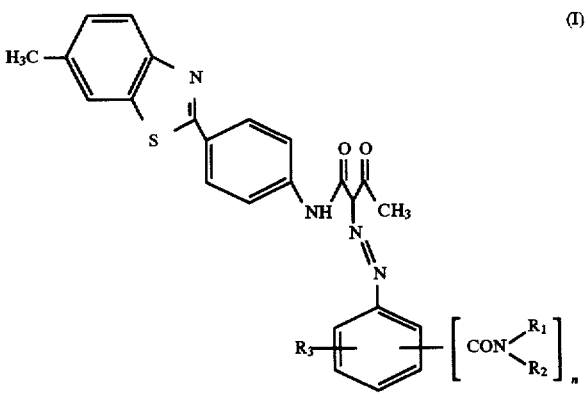

in which

R₁ and R₂ independently of one another are a hydrogen atom, $C_1$–$C_4$-alkyl, $C_5$–$C_6$-cycloalkyl, a benzyl group, an unsubstituted phenyl group or a substituted phenyl group with 1 to 5 substituents selected from the group consisting of $C_1$–$C_4$-alkyl, $C_1$–$C_4$-alkoxy, halogen, nitro, cyano, hydroxyl, $CF_3$, $CONH_2$, $CONH(C_5$–$C_6$-cycloalkyl), $CON(C_1$–$C_4$-alkyl)$_2$, $CONH(C_1$–$C_4$-alkyl), $COO(C_1$–$C_4$-alkyl), $COO(C_5$–$C_6$-cycloalkyl) and CONH(phenyl);

R₃ is a hydrogen atom, $C_1$–$C_4$-alkyl, $C_1$–$C_4$-alkoxy, halogen, nitro, cyano, hydroxyl, $CF_3$, $COO(C_1$–$C_4$-alkyl) or $COO(C_5$–$C_6$-cycloalkyl) and n is 1 or 2.

2. A compound as claimed in claim 1, in which

R₁ is a hydrogen atom or a $C_1$–$C_4$-alkyl, a benzyl group or a phenyl group;

R₂ is a hydrogen atom, a $C_1$–$C_4$-alkyl, or a phenyl group with 1 to 3 substituents selected from the group consisting of $C_1$–$C_4$-alkyl, $C_1$–$C_4$-alkoxy, F, Cl, Br, $CF_3$, $CONH_2$, $CONH(C_1$–$C_4$-alkyl) and $COO(C_1$–$C_4$-alkyl);

R₃ is a hydrogen atom, methyl, ethyl, methoxy, ethoxy, F, Cl, Br, nitro, $CF_3$, $COOCH_3$ or $COOC_2H_5$; and n is 1 or 2.

3. A compound as claimed in claim 1, in which R₁ is hydrogen, methyl, ethyl, isopropyl or n-butyl.

4. A compound as claimed in claim 1, in which R₂ is hydrogen, methyl, ethyl, isopropyl, n-butyl, cyclohexyl, benzyl, dimethylphenyl, methoxyphenyl, dimethoxyphenyl, chlorophenyl, dichlorophenyl, dimethoxychlorophenyl, carboxymethylphenyl, carboxamidophenyl, trifluoromethylphenyl or trifluoromethylchlorophenyl.

5. A compound as claimed in claim 1, in which R₃ is hydrogen, methyl, ethyl, methoxy, ethoxy, fluorine, chlorine, bromine, nitro, $CF_3$, $COOCH_3$ or $COOC_2H_5$.

6. A process for the preparation of a compound of the formula (I) as claimed in claim 1, which comprises diazotizing one or more amines of the formula (II)

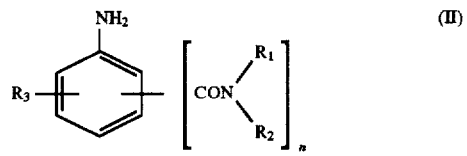

in which R₁, R₂, R₃ and n have the meanings defined in formula (I), and coupling the diazotization product with a compound of the formula (III)

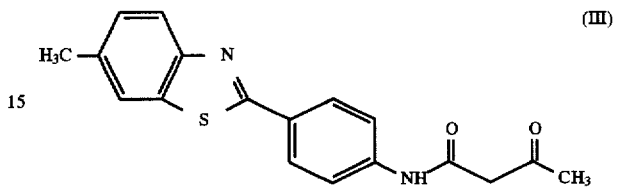

in a molar ratio of 1:0.9 to 1.1.

7. The process as claimed in claim 6, wherein a solution, suspension or dispersion of the diazotized amine of the formula (II) is added to a dispersion or suspension of a compound of the formula (III), or a suspension or dispersion of a compound of the formula (III) is added to a solution, suspension or dispersion of the diazotized amine of the formula (II).

8. The method of pigmenting a substrate selected from the group consisting of high molecular weight organic materials, paints, coating materials, electrophotographic toners and developers, powders and powder coatings which can be sprayed triboelectrically or electrokinetically and inks, comprising the step of adding a compound of the formula (I) as claimed in claim 1 to said substrate.

9. The method as claimed in claim 8, wherein the high molecular weight organic material is a polyolefin.

10. A method according to claim 9, wherein the polyolefin is polyethylene or polypropylene.

11. The method as claimed in claim 8, wherein the ink is a printing ink for nitrocellulose illustration gravure printing.

* * * * *